Nov. 12, 1957

G. L. ROGERS 2,812,958

CAM RELEASE PIPE COUPLER

Filed Nov. 7, 1955

INVENTOR,
GERALD L. ROGERS,
BY Terry and Cohn
ATTORNEYS.

United States Patent Office 2,812,958
Patented Nov. 12, 1957

2,812,958

CAM RELEASE PIPE COUPLER

Gerald L. Rogers, Olivette, Mo., assignor to Stile-Craft Manufacturers, Inc., St. Louis, Mo., a corporation of Missouri Application November 7, 1955, Serial No. 545,429

3 Claims. (Cl. 285—18)

This invention relates generally to improvements in hose couplers.

It is an important objective of the present improvements to realize a coupler that is especially adapted to be quickly and easily connected and as readily disconnected, the coupler being intended more particularly as a means for making quick connection and disconnection of sections of hose and of a hose to a water faucet.

Another important objective is realized by providing a coupler that is simple and durable in consrtuction, and economical to manufacture. The coupler embodies only three parts, i. e., a male member, a female member and an O-ring, arranged to afford an effective seal and to provide a quick-detachable connection between the members.

Yet another important objective is realized by the provision of means that assist in disconnecting the members of the coupler, the means including coacting camming shoulders adapted to engage upon relative rotative movement of the members to urge the members axially apart.

Another important object is realized by a camming structure between the coupling members adapted to afford the functional advantages discussed above upon relative rotative movement in combination with a swivel connection that permits such a movement incident to detachment.

Other advantages are realized in that the swivel connection affords a seal and a quick-detachable connection between the male and female members of a coupling.

Figure 1:
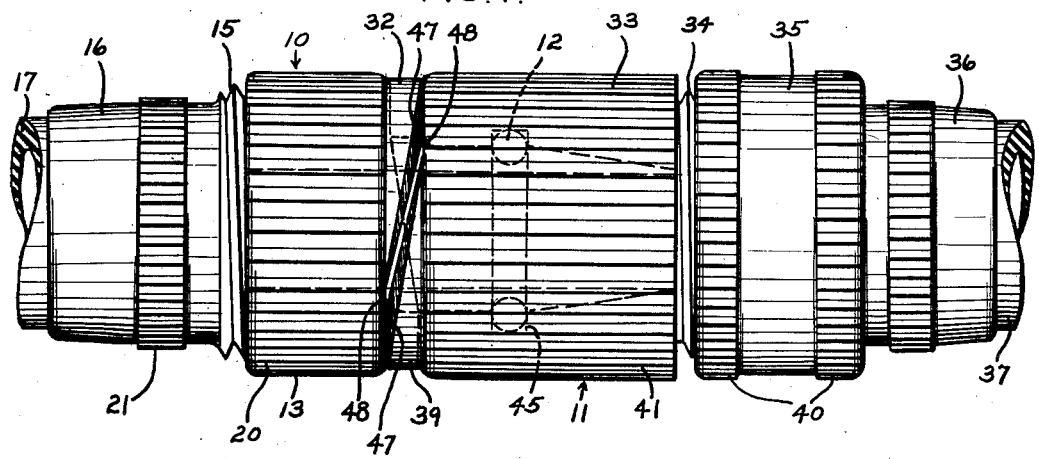
Figure 2:
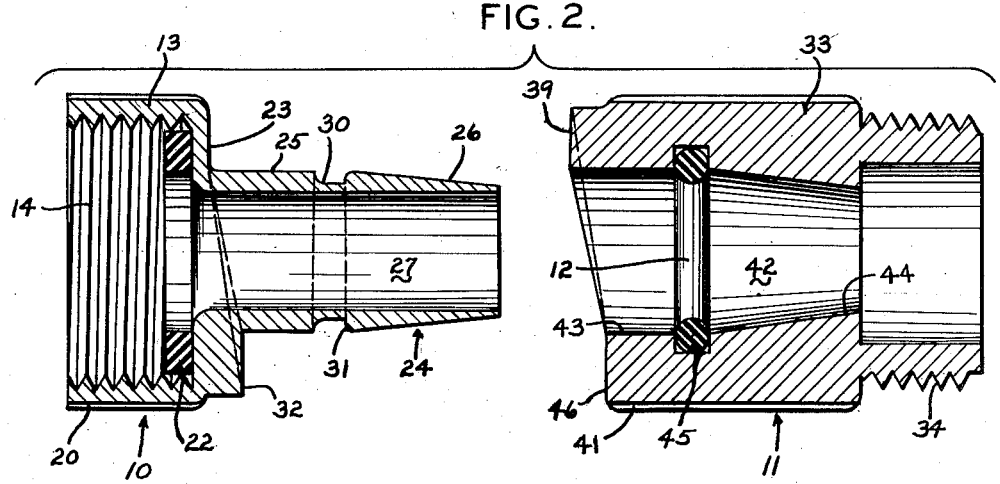

The foregoing and numerous other objects and advantages of the invention will more clearly appear from the following detailed description of a preferred embodiment, particularly when considered in connection with the accompanying drawing, in which:

Fig. 1 is a side elevational view of the coupler shown connected to a pair of hose fittings, and Fig. 2 is a cross sectional view of the coupler as seen in a plane passed through the longitudinal axis thereof, the members of a coupler being shown in a detached relation.

Referring now by characters of reference to the drawing, it is seen that the coupling consists of only three parts, a male member generally indicated at 10, a female member designated at 11, and an O-ring referred to generally at 12 carried by the female member 11. These component parts of the coupling are arranged to provide an effective seal and to provide a quick-detachable connection between the members 10 and 11.

The male member 10 includes a cylindrical body portion 13 in which a threaded socket 14 is formed as is best shown in Fig. 2. The threaded socket 14 is particularly adapted to receive and retain the threaded nipple 15 (Fig. 1) of hose fitting 16, the fitting 16 being of conventional type attached to the end of a hose 17 shown in cross section in Fig. 1. A plurality of groove formations 20 are provided peripherally on body portion 13 to facilitate connection and disconnection of the coupling members 10 and 11 in a manner fully described subsequently, and to facilitate connection of the male member 10 to hose fitting 16. It will be noted that fitting 16 is provided with an annular ribbed or knurled collar 21 that is particularly adapted to be gripped during manipulation.

A washer 22 is located in threaded socket 14 and is arranged to abut the forward wall 23 of body portion 13. The washer 22 is adapted to abut the end of threaded nipple 15 to provide an effective seal between the fitting 16 and body portion 13.

The male member 10 also includes a plug referred to generally at 24 in Fig. 2 that is formed integrally with the forward wall 23 of body portion 13, the plug including a cylindrical portion 25 and a forwardly tapered plug head 26. The cylindrical plug portion 25 is smaller in diameter than the cylindrical body portion 13. A longitudinal passage 27 extends axially through plug 24 and opens at the end of plug head 26, the passage 27 communicating with threaded socket 14 and hence with the hose 17 and fitting 16.

Located on plug 24 immediately to the rear of tapered plug head 26 is an annular groove 30 adapted to seat and receive the innermost portion of O-ring 12 when the male member 10 is operatively connected to the female member 11. The annular groove 30 is partially defined along one side by a rounded shoulder 31 adapted to engage and coact with the O-ring 12 in the manner and for the purpose later described.

Provided on front wall 23 of body portion 13 is a pair of camming shoulders 32 that are arcuately spaced and project forwardly of wall 23 in the same direction as plug 24. The projecting shoulders 32 assist in quickly detaching the male member 10 from female member 11 as will be subsequently described after additional description of the female member 11 of the coupler.

The female member 11 consists of a body portion 33 having an externally threaded nipple 34 adapted to be received in the threaded socket 35 (Fig. 1) of a conventional hose fitting 36 attached to the end of a hose indicated at 37. The hose fitting 36 includes knurled collars 40 to facilitate manipulation. Further, the body portion 33 of female member 11 includes a plurality of groove formations 41 which may be conveniently gripped manually to cause relative rotative movement between members 10 and 11 to effect operative detachment.

Formed in body portion 33 of female member 11 is a socket 42 adapted to receive and seat the plug 24 of male member 10. The socket 42 is open at the forward end of body portion 33 and communicates with the threaded nipple 34, and hence communicates with fitting 36 and connected hose 37. The socket 42 includes a cylindrical portion 43 that conforms closely to the periphery of cylindrical plug portion 25, and includes a tapered portion 44 that conforms closely to the periphery of tapered plug head 26. An annular groove 45 is formed in socket 42 immediately adjacent the tapered socket portion 44, the groove 45 being aligned with annular groove 30 of plug 24 when the plug 24 is operatively interfitted in socket 42. As is best shown in Fig. 2, the groove 45 has a substantially square bottom adapted to receive the outermost portion of O-ring 12 and serves to seat and retain the O-ring in socket 42.

A pair of arcuately spaced coacting camming shoulders, 39 is provided on front wall 46 of body portion 33. Each of shoulders 32 and 39 occupy approximately 140 degrees about the respective male and female members 10 and 11, and includes a camming wall 47. Because shoulders 32 and 39 occupy only 140 degrees, a cam dwells 48 is provided for the remaining 40 degrees between each pair of such shoulders. The camming walls 47 are angularly related to the longitudinal axis of male and female members 10 and 11.

When the male member 10 is operatively connected to female member 11 as is shown in Fig. 1, the members may be relatively rotatively moved for 40 degrees as a result of dwells 48 before shoulders 32 and 39 engage. Then upon further rotation the slidable engagement of camming walls 47 of shoulders 32 and 39 tend to displace axially members 10 and 11, and hence withdraws plug 24 from socket 42.

To connect the members 10 and 11 of the coupling, the plug 24 is inserted in socket 42. The tapered plug head 26 engages O-ring 12 and compresses the ring 12 into annular groove 45. When plug 24 is fully inserted in socket 42 the O-ring 12 snaps into aligned annular groove 30 formed on plug 24. As is shown in Fig. 1, the O-ring 12 occupies both annular grooves 30 and 45 so as to form an effective seal between plug 24 and socket 42, and to provide a swivel connection that prevents unintentional or accidental withdrawal of the plug 24 from socket 42 and yet permits relative rotative movement between members 10 and 11. As has been mentioned previously, the projecting camming shoulders 32 and 39 are interfitted when the plug 24 is operatively connected and retained in socket 42. The swivel connection provided by O-ring 12 and aligned grooves 30 and 45 serve to hold members 10 and 11 in assembly and serve to prevent unintentional detachment up to the application of a predetermined axial force. In being utilized as a hose coupling for connecting hose sections or a hose to a water faucet, for example, the O-ring and cooperating grooves 30 and 45 are usually designed to operate satisfactorily on water pressures up to about 100 lbs. per sq. in.

In order to detach the members 10 and 11 of the coupling, the members are relatively rotatively moved, the swivel connection of the O-ring 12 and cooperating grooves 30 and 45 permitting such movement. As the members 10 and 11 are rotated relative to one another, the camming walls 47 of shoulders 32 and 39 engage and act to displace axially the members 10 and 11 from one another. As the members 10 and 11 are axially separated by camming shoulders 32 and 39 upon rotative movement of the members, the rounded shoulder 31 is urged against the compressible O-ring 12 and acts to compress O-ring 12 into annular groove 45, the O-ring 12 riding outwardly over rounded shoulder 31 and onto the periphery of tapered plug head 26. After O-ring 12 is disengaged from annular groove 30, the plug 24 may be simply axially withdrawn from socket 42. The O-ring 12 is retained in annular groove 45 and is positioned for subsequent reengagement with groove 30 upon insertion of plug 24.

Because of the necessary tight fit between O-ring 12 in cooperating grooves 30 and 34 to provide an effective seal and to provide a retaining connection between members 10 and 11, it is seen that the shoulders 32 and 39 facilitate the operative disconnection of members 10 and 11.

Although the invention has been described by making detailed reference to a single preferred embodiment, such detail is to be understood in an instructive, rather than in any restrictive sense, many variants being possible within the scope of the claims hereunto appended.

I claim as my invention:

1. In a coupling, a female member having a socket, a male member having a plug adapted to interfit said socket, swivel means for detachably connecting said plug in said socket, a camming shoulder on each of said members, said shoulders occupying an arcuate portion of said members and adapted to interfit as the members are operatively connected, each of said shoulders having a camming wall extending arcuately for a distance to provide a dwell between said shoulders, said camming walls being angularly related to the longitudinal axis of said plug and socket, and being adapted to engage upon relative rotative movement of said members so as to cause axial separation of said members and operative detachment of said plug from said socket, the shoulders operating in said dwell to permit rotative movement of said members for a distance before operative engagement of said camming walls, the swivel means cooperating with said shoulders and dwell to permit such rotative movement to prevent unintentional withdrawal of the plug from said socket.

2. In a coupling, a female member having a socket, a male member having a plug adapted to interfit said socket, an annular groove in said socket, a cooperating annular groove in said plug, said grooves being arranged in alignment when the plug is disposed operatively in said socket, an O-ring disposed in said grooves for sealing and detachably retaining the connection of said members, said O-ring and grooves constituting a swivel connection permitting relative rotative movement of said members, a camming shoulder on each of said members occupying an arcuate portion and adapted to interfit as the members are operatively connected, the camming shoulders extending arcuately for a distance to provide a dwell between said shoulders, said shoulders engaging upon relative rotative movement of said members so as to separate axially said plug from said socket and to disengage operatively the O-ring from one of said grooves, said O-ring being compressible in one of said grooves to permit release of said plug selectively from said socket, the shoulders operating in said dwell to permit rotative movement of said members for a distance before operative engagement of said camming shoulders, the swivel connection cooperating with the shoulders and dwell to permit such rotative movement to prevent unintentional withdrawal of the plug from said socket.

3. In a coupling, a female member having a socket, a male member having a plug adapted to interfit said socket, an annular groove in said socket, a cooperating annular groove in said plug, an O-ring disposed in said grooves for sealing and detachably retaining the connection of said members, the O-ring and grooves constituting a swivel connection permitting relative rotative movement of said members, a pair of arcuately spaced projecting camming shoulders on each of said members, said shoulders occupying an arcuate portion of said members so as to interfit when the members are operatively connected, said shoulders of each member extending arcuately for a distance to provide dwells therebetween when so connected, said shoulders having coacting camming walls adapted to engage upon relative rotative movement of said members to effect axial displacement and separation of said plug from said socket and to effect operative disengagement of the O-ring from one of said grooves, said O-ring being compressible in one of said grooves to release the plug selectively from said socket, the shoulders operating in said dwells to permit rotative movement of said members for a distance before operative engagement of said camming walls, the swivel connection cooperating with the structural arrangement of the shoulders and dwells to permit such rotative movement to prevent unintentional withdrawal of the plug from said socket.

References Cited in the file of this patent

UNITED STATES PATENTS

| | | |
|---|---|---|
| 155,268 | Stocker | Sept. 22, 1874 |
| 862,349 | Robbins | Aug. 6, 1907 |
| 902,806 | De Worth | Nov. 3, 1908 |
| 1,117,856 | Kent | Nov. 17, 1914 |
| 2,453,391 | Whittingham | Nov. 9, 1948 |

FOREIGN PATENTS

| | | |
|---|---|---|
| 663,255 | Great Britain | Dec. 19, 1951 |